3,705,223
PRODUCING SINTERED ALUMINA FIBERS FROM AN ALUMINA SLIP OF VERY HIGH SOLIDS CONTENT
Alan Pearson, St. Louis, Mo., and John E. Marhanka, Belleville, Ill., assignors to Aluminum Company of America, Pittsburgh, Pa.
No Drawing. Continuation-in-part of abandoned application Ser. No. 781,979, Dec. 6, 1968. This application July 28, 1971, Ser. No. 166,967
Int. Cl. C04b 33/18, 35/10
U.S. Cl. 264—56
8 Claims

ABSTRACT OF THE DISCLOSURE

Using dispersing agents, slips formed of a volatile fluid and containing 80 to 90% of discrete alpha alumina particles with a median diameter of 0.3 to 2.5 microns and having a viscosity above 5000 centipoise are made. The slip is then formed into threads in an evaporative environment to concurrently remove a portion or all of the liquid ingredient thus forming self supporting fibers which are then sintered.

---

This application is a continuation-in-part of our application Ser. No. 781,979 filed Dec. 6, 1968, and now abandoned.

This invention relates to the fabrication of high temperature fibrous ceramic materials and particularly to a method of forming polycrystalline high purity alumina fibers.

Despite the growing demand for composite fibrous materials having higher melting points than fiber glass and aluminum silicate glass for high temperature structural shapes and insulation and the like, efforts to produce fibrous alumina have not, except for the highly expensive vapor deposition of single crystal alumina "whiskers," been attended with any appreciable degree of success. In its broad aspects therefore this invention may be briefly described as an improved method of fabricating high purity alumina fibers which includes the steps of forming an elongate and substantially self-supporting green thread from a selectively constituted high solids alumina slip and sintering the green thread to produce a ceramically bonded polycrystalline alumina fiber.

Among the advantages attendant practice of the instant invention is the permitted production of high purity polycrystalline alumina fiber whose maximum use temperatures are appreciably higher than those obtainable from conventionally employed fibrous materials, such as fiber glass and fibers of aluminum silicate glass. Another advantage of the subject invention is the permitted quantity production of such high purity alumina fibers in lengths up to six inches or greater and with a controllable fiber diameter from as little as 15 microns up to about 100 microns, in a simple and relatively inexpensive manner.

The primary object of this invention is the provision of an effective method for producing polycrystalline high-purity alumina fibers. Still other objects and advantages of the invention will become apparent from the following portions of this specification which describe the presently preferred steps of fabricating polycrystalline alumina fibers in accordance with the principles of this invention.

As indicated above, practice of the subject invention includes the forming of substantially self-supporting green threads from a high solids alumina slip of the general type disclosed by W. E. Hauth, Jr. in "Behavior of the Alumina-Water System," J. Physical and Colloidal Chemistry 54(1), January 1950 and selectively constituted as hereinafter disclosed. In accord with the principles of this invention, such selectively constituted high solids slip includes the utilization of calcined alpha type alumina which has been finely ground to provide discrete crystallites having a desired median crystallite diameter falling in the range of from .3 micron or less up to about 2.5 microns and with an upper limiting dimension in the region of about 5 microns. Such slip is desirably constituted of about 85%, and suitably in the range of 80 to 90%, of such discrete alpha type alumina particles dispersed in a volatile fluid such as water, alcohol or suitable ketone having a viscosity of at least 5,000 centipoise as measured by a Brookfield viscosimeter using spindle RV-4 operating at 5 r.p.m. The viscosity of the slip preferably should fall within the range of 5000 to 15,000 centipoise, however acceptable fibers may be formed from slips of appreciably higher viscosity, as for example, as high as 60,000 centipoise. Such a selectively constituted high solids slip will afford an almost immediate effective degree of solidification thereof when a minimal change in fluid content is effected to thereby provide a substantially self-supporting green thread concurrently with the formation thereof. By way of general example, such a suitable high solids slip desirably includes the utilization of minimal quantity of water as the volatile fluid vehicle with an associated dispersing agent of suitable character. Slips having such requisite properties are normally constituted by about 80 to 90% of the discrete alpha type alumina particles of the size range specified above and such dispersing agents in the amount of about 0.1 to 1% have been found suitable. By way of operative example, suitable high solids slips of the requisite character are readily formed by the incremental addition of such calcined alpha type alumin i.e. for example, Alcoa A16 alumina, to about 400 cc. of water and dispersing agent in a 1.3 gallon ceramic jar mill. The following table illustratively identifies some suitable dispersing agents and the nature of the high solids slip resulting therefrom.

| Additive | | Final slip properties | | |
|---|---|---|---|---|
| Type | Level (percent)[1] | Water (percent)[1] | pH | Fiber forming |
| 1. Aluminum nitrate | 1.0 | 20 | 3.0 | Fair. |
| 2. Marasperse CB [2] | 0.5 | 20 | 9.3 | Good. |
| 3. Tetramethyl ammonium hydroxide. | 0.9 | 18 | 12.0 | Fair. |
| 4. Hydrochloric acid | 0.5 | 18 | 4.1 | Good. |
| 5. Nitric acid | 0.5 | 18 | 5.3 | Do. |
| 6. Citric acid | 0.5 | 18 | 7.8 | Excellent. |
| 7. Tartaric acid | 0.5 | 18 | | Do. |
| 8. Victamide [3] | 0.5 | 18 | 9.0 | Do. |

[1] Percentages on alumina basis.
[2] TM, a lignosulfonate as manufactured by General Tire and Rubber Co.
[3] TM, an ammonium salt of an amido polyphosphate as manufactured by the Victor Chemical Co.

A preferred formulation having a viscosity in the above described range includes, for each 100 parts of finely ground alpha alumina as described above and having a median particle size about 0.4 micron (as measured by electron microscopy), from about 16 to 22 parts of water and about one-half part of a composite additive, suitably constituted, for example, of a dispersing agent such as .3 part of citric or tartaric acid and about .2 part of a deflocculant such as a sodium based polyelectrolyte as Darvan No. 7, manufactured by the R. T. Vanderbilt Co., to prevent settling thereof upon standing.

Evidence to date has indicated that green threads of the requisite character are generally satisfactorily formed from high solids slips of the type delineated above having 20% or less water content. Such green threads apparently cannot be formed with water contents of 25% and greater. In the intervening range threads may be formed but will usually be of such limited quantity or poor character as to preclude any commercially effective utilization thereof.

While evidence to date indicates that water is a preferred volatile fluid for reasons no other than economic and/or convenience, there undoubtedly exist many other volatile fluids that are utilizable in the practice of the subject invention. Possible fluids that might be used could illustratively include—alcohols such as ethanol, i-propanol, n-hexanol and diacetone alcohol and ketones such as methyl-ethyl-ketone, methyl-isobutyl ketone and acetone. Other possible solvents might include i-propyl ether, propionaldehyde and hydrogenated solvents such as ethylene trichloride and tetrachloroethane. Even basic hydrocarbon solvents such as benzene, toluene, xylene and n-heptane might be possessed of some utility as a possible volatile fluid for use in the practice of this invention. For example, an 88% solids slip was made employing aluminia having a median particle size of abou 0.6 micron with hexyl alcohol as the solvent and a small amount of an organic phosphate dispersant sold under the trade name "Alkapent 6 TDS" manufactured by the Wayland Chemical Co. The slip performed very well in forming fibers.

The described high solids slip may be formed into an elongate green thread of the requisite character by several different methods, such as by flow through a forming orifice, by use of an air blast or jet, by elevation of a forming tool subsequent to immersion in the slip or the like, all of which involves rapid exposure to or the forming of the green thread in an evaporative environment. A suitable method of green thread formation is to pump the slip onto the center of a spinning concave disc, for example, rotating at a speed imparting a tangential velocity of about 3 to 4 feet per second thereto, which serves to effect fiberization by a combination of centrifugal forces and viscous shear. Suitable fiberization has been effected by utilization of a 2 inch diameter disk rotating at a speed of 370 to 400 r.p.m.

A preferred method of green thread formation is to introduce the high solids slip on to the upper surface of a spinning plate which distributes the slip on the surrounding inner surface of a rotating cylinder. The slip there flows to the bottom edge of the rotating cylinder where it is thrown out forming the green threads of the specified character. This means of green thread formation permits the utilization of higher spinner speeds which are roughly proportional to the square root of the spinner diameter. By way of example, spinner speeds of about 430 r.p.m. were found to work well for a 4½ diameter spinning cylinder, as did speeds of from about 225 to 275 r.p.m. for a 12 inch diameter spinning cylinder. Presently available information appears to indicate that the product of the spinning cylinder speed, in r.p.m. and the square root of the cylinder diameter, in feet, should fall somewhere between 200 and 300.

Another preferred method of green thread formation employs a rotating cylindrical container of about 8 to 12 inches in diameter and having a plurality of small extension nozzles radially disposed around base of the side walls thereof. Such a container is adapted to be filled with a predetermined quantity of a high solids slip of the type described in a batch type operation or continually fed with such a high solids slip in a continuous type operation. The nozzles have openings typically in the range of from 0.030–0.080 inch in diameter with openings of from 0.035–0.045 inch being preferred. In an exemplary operation, a 10 inch diameter cylindrical container will be rotated at about 250 r.p.m. and such rotation will cause the slip to be extruded by centrifugal force through the nozzles to form the green threads of the requisite character when such extruded threads are introduced into an evaporative environment.

In any of the above forming methods, however, the slip is so high in solids content that, as the water content is slightly reduced during the forming operations, as by evaporation, solidification is concurrently effected at least to the degree to form a substantially self-supporting green thread and thus prevent return thereof to an equilibrium droplet condition. In general, the higher degree of water content in the above described slip formation serves to produce the smaller fiber diameters.

The elongate green threads formed as above described are then sintered to produce a ceramic bond between the crystallites and a unitary polycrystalline fiber of high purity alumina. Efforts to date in the practice of the foregoing method have produced high purity (i.e. up to 99.9% $Al_2O_3$) fibers of six inches or greater in length and having diameters from 15 to 100 microns and greater.

Having thus described our invention, we claim:

1. In the fabrication of polycrystalline alumina fibers, the steps of
    forming an elongate green thread from a high solids, non-colloidal slip having a viscosity of at least 5000 centiposie and comprising 80–90%, based on the weight of said slip, of discrete alpha alumina crystallite particles having a median crystallite diameter between 0.3 and 2.5 microns dispersed in a volatile fluid that includes a dispersing agent, said volatile fluid being selected from the group consisting of water, alcohols and ketones,
    displacing said green thread through an evaporative environment substantially concurrent with the formation thereof to remove sufficient volatile fluid therefrom to render said green thread substantially self-supporting, and
    sintering said green thread to produce a coherent polycrystalline alumina fiber having a ceramic bond intermediate the particles thereof.

2. The method as set forth in claim 1 wherein said slip has a viscosity of from 5,000 to 15,000 centipoise.

3. The method as set forth in claim 1 wherein said dispersing agent includes at least one member selected from the group consisting of citric acid and tartaric acid.

4. The method as set forth in claim 1 wherein said alpha alumina particles are predominantly of a crystallite diameter of less than about 5 microns.

5. The method as set forth in claim 1 wherein said green threads are formed by centrifugally induced displacement of portions of said high solids slip.

6. The method as set forth in claim 1 wherein said green threads are formed by centrifugally induced extrusion of said high solids slip through discrete nozzle members.

7. The method as set forth in claim 6 wherein said nozzle members are mounted on a rotatable container for said slip.

8. In the fabrication of polycrystalline alumina fibers, the steps of
    forming an elongate green thread from a high solids, non-colloidal slip having a viscosity of at least 5000 centipoise and comprising 80–90%, based on the weight of said slip, of discrete alpha alumina crystallite particles having a median crystallite diameter between 0.3 and 2.5 microns dispersed in a water medium that includes a dispersing agent, displacing said green thread through an evaporative environment substantially concurrent with the formation thereof to remove sufficient water therefrom to render said green thread substantially self-supporting, and sintering said green thread to produce a coherent polycrystalline alumina fiber having a ceramic bond intermediate the particles thereof.

References Cited

UNITED STATES PATENTS

| | | | |
|---|---|---|---|
| 2,825,108 | 3/1958 | Pond | 264—8 |
| 3,014,835 | 12/1961 | Feigler, Jr. et al. | 264—60 |
| 3,082,099 | 3/1963 | Beasley et al. | 264—Dig. 19 |
| 3,108,888 | 10/1963 | Bugosh | 264—Dig. 19 |
| 3,110,545 | 11/1963 | Beasley et al. | 264—Dig. 19 |
| 3,180,741 | 4/1965 | Wainer et al. | 264—Dig. 19 |
| 3,270,101 | 8/1966 | Kelsey | 264—Dig. 19 |
| 3,311,689 | 3/1967 | Kelsey | 264—Dig. 19 |
| 3,322,865 | 5/1967 | Blaze, Jr. | 264—Dig. 19 |
| 3,346,680 | 10/1967 | Bush | 264—63 |
| 3,491,492 | 1/1970 | Ueltz | 264—63 |

FOREIGN PATENTS

| | | | |
|---|---|---|---|
| 740,956 | 8/1966 | Canada | 106—65 |
| 808,583 | 7/1956 | Great Britain | 264—63 |

OTHER REFERENCES

Transactions of The British Ceramic Society, August 1963, at 659–672.

DONALD J. ARNOLD, Primary Examiner

J. H. MILLER, Assistant Examiner

U.S. Cl. X.R.

106—65; 264—63, 86, Dig. 19